(No Model.)
F. A. PHELPS, Jr.
PIPE COUPLING.
No. 604,159.
Patented May 17, 1898.
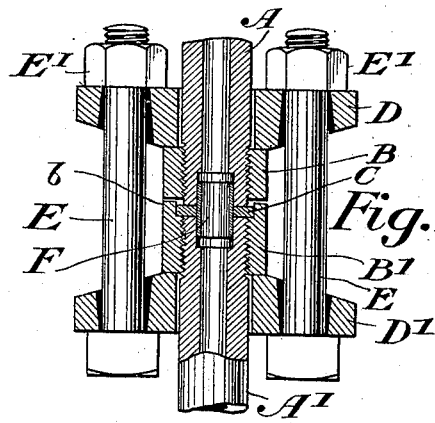
Fig. 1.
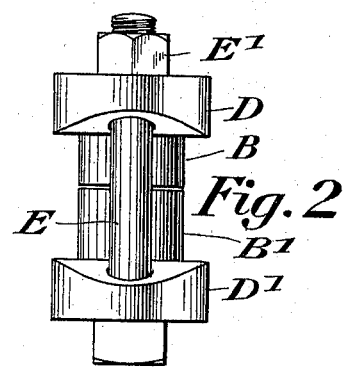
Fig. 2.
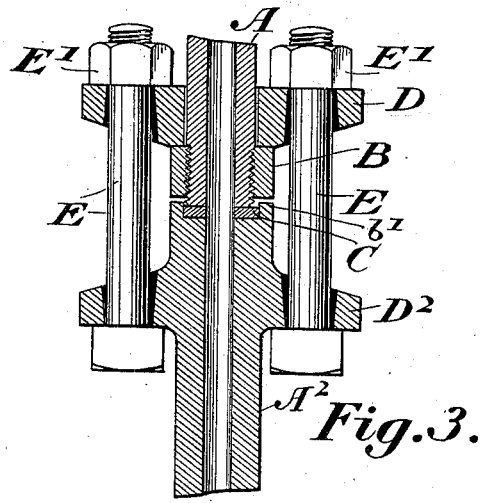
Fig. 3.
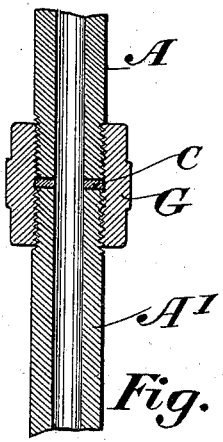
Fig. 4.
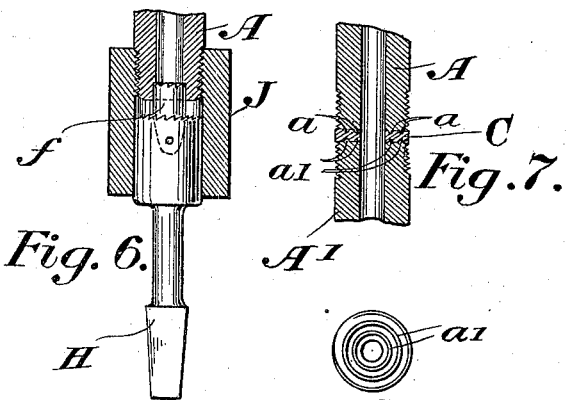
Fig. 6. Fig. 7.
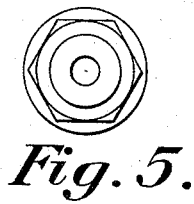
Fig. 5.
Fig. 8.
WITNESSES:
Myrth E. Sharpe.
H. C. Stitt.
INVENTOR
F. A. Phelps Jr.
BY Richard Eyre
ATTORNEY.
THE NORRIS PETERS CO., PHOTO-LITHO., WASHINGTON, D. C.

United States Patent Office.

FREDERICK A. PHELPS, JR., OF JOHNSTOWN, PENNSYLVANIA.

PIPE-COUPLING.

SPECIFICATION forming part of Letters Patent No. 604,159, dated May 17, 1898.

Application filed September 1, 1897. Serial No. 650,280. (No model.)

*To all whom it may concern:*

Be it known that I, FREDERICK A. PHELPS, Jr., of Johnstown, Cambria county, Pennsylvania, have invented a certain new and useful Pipe-Coupling, of which the following is a specification.

My invention relates to pipe-couplings and means for preparing the pipes therefor, and is especially adapted for use with pipe systems supplying an unusually high pressure—such as, for instance, a system used in connection with refrigerating machinery in which carbonic acid is the active element.

The object of my invention is to provide a simple and economical form of coupling and yet one that will be highly durable and efficient, preventing leakage, and capable of easy repair.

With this general object in view my invention consists in the provision of pipes having their ends scored, a gasket between the said scored ends, and means for compressing the gasket, so that it will conform to the scoring of the pipe ends and more surely prevent any leakage from the inside of the pipes.

My invention further consists in the novel construction, arrangement, and combination of parts, which will be hereinafter fully described, due reference being had to the accompanying drawings.

Referring to said drawings, Figures 1 and 2 represent, respectively, sectional and end views of one form of my improved coupling. Fig. 3 is a sectional view of a slightly-different form of coupling especially suited to a coupling between a pipe and a pipe-fitting. Figs. 4 and 5 are respectively sectional and plan views of another form of my invention. Fig. 6 shows the means I employ for preparing the ends of the pipes for the coupling. Figs. 7 and 8 are respectively sectional and plan views illustrating the preferred condition of the pipe ends when ready for coupling.

The pipes to be coupled are represented as A and A'. Before coupling the ends of these pipes are finished and scored, as hereinafter set forth.

Referring more particularly to the form of coupling shown in Figs. 1 and 2, the collars B and B' are screwed upon the threaded ends of the pipes A and A'.

C is a gasket, preferably of lead, fiber, or other easily-compressible material, of substantially the section of the pipes.

$b$ is a projection on the collar B' and is intended to prevent the flowing of the gasket when it is compressed between the pipes.

D and D' are flanges which engage the collars B and B', and E E are bolts which engage the said flanges and by means of the nuts E' E' draw them toward each other to compress the gasket and form the joint.

I have also shown in Fig. 1 a metallic ferrule F, which slides in recesses in the ends of the pipes A and A' and serves to prevent the gasket from spreading into the inside of the pipe, reducing the size of the orifice and making a rough inside surface.

In case the element flowing through the system is one that is liable to corrode the gaskets this ferrule gives the added advantage of minimizing corrosion by protecting the inside of the gasket therefrom.

The coupling can be successfully used without this ferrule; but I generally prefer to provide my coupling with it.

In Fig. 3, $A^2$ represents a pipe-fitting having a flange $D^2$ and the projection $b'$ for the gasket. The mode of operation is evidently exactly similar to that already described; but the collar B' and the flange D' have been dispensed with. In this modification I have not shown the ferrule; but this can readily be provided, if desired.

In Figs. 4 and 5 the pipes A and A', with the same gasket C, are coupled by the nut G, into which each pipe is secured. This form dispenses with the collars, flanges, and bolts; but its mode of action is similar, as the gasket is compressed by the turning of the nut G, and the latter acts in the same way as the projection $b$ of the collar B'. It is of course clear that the ferrule F may be inserted in this form of coupling in case conditions make its provision desirable.

Referring now to Figs. 6 to 8, inclusive, J is a member having a circular passage of substantially the same diameter as the outside diameter of pipe A. It is formed at one end with a female thread to secure it about the end of the pipe A, its other end forming a guide for a milling-tool H, which may be operated by a hand or power device. The end of the milling-tool H is preferably formed with a series of annular recesses, so as to score the end of the pipes with the ridges $a$ and $a'$, which will press into the gasket and aid in preventing leakage. I may of course provide the milling-tool with ridges, so forming annular recesses in the end of the pipe, if desired. When the ferrule F is to be used, the small milling-tool $f$ is secured to the end of H to form the recess in the end of the pipe to receive the ferrule.

While I have shown and described specific embodiments of my invention I desire to make it clear that these specific embodiments are merely chosen to illustrate the capabilities of my invention, and I am not, therefore, limited to the particular devices shown and described.

Having thus fully described my invention, what I claim, and desire to protect by Letters Patent, is—

1. In a pipe-coupling, the combination of the pipes having scored ends, the gasket between said ends, the collars around said ends, the projection upon one of said collars engaging the periphery of said gasket, and the flanges and bolts for compressing the gasket between the pipe ends and the said projection.

2. A pipe-coupling comprising the combination with the recessed and scored ends of the pipe members, of a ferrule within the registering recesses, a gasket between the scored ends, and means for compressing the gasket and securing the whole together.

In testimony whereof I have affixed my signature in presence of two witnesses.

FREDERICK A. PHELPS, JR.

Witnesses:
H. W. SMITH,
RICHARD EYRE.